United States Patent
Nam et al.

(10) Patent No.: US 12,273,449 B2
(45) Date of Patent: Apr. 8, 2025

(54) ELECTRONIC DEVICE AND METHOD OF USING PAIRWISE MASTER KEY

(71) Applicant: SAMSUNG ELECTRONICS CO., LTD., Suwon-si (KR)

(72) Inventors: Chounjong Nam, Suwon-si (KR); Junhak Lim, Suwon-si (KR); Seongsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 17/863,085

(22) Filed: Jul. 12, 2022

(65) Prior Publication Data

US 2023/0039335 A1    Feb. 9, 2023

Related U.S. Application Data

(63) Continuation of application No. PCT/KR2022/008100, filed on Jun. 9, 2022.

(30) Foreign Application Priority Data

Aug. 9, 2021    (KR) .................. 10-2021-0104383

(51) Int. Cl.
*H04L 29/00* (2006.01)
*H04L 9/08* (2006.01)
*H04W 12/06* (2021.01)

(52) U.S. Cl.
CPC ............. *H04L 9/088* (2013.01); *H04W 12/06* (2013.01)

(58) Field of Classification Search
CPC ...... H04L 9/088; H04L 9/0894; H04W 12/06; H04W 12/041; H04W 12/0431;
(Continued)

(56) References Cited

U.S. PATENT DOCUMENTS

| 2011/0010539 A1 | 1/2011 | Salomone |
| 2014/0050320 A1* | 2/2014 | Choyi ................ H04W 12/06 380/270 |

(Continued)

FOREIGN PATENT DOCUMENTS

| JP | 2002-217896 A | 8/2002 |
| JP | 4856743 B2 | 1/2012 |

(Continued)

OTHER PUBLICATIONS

International Search Report (PCT/ISA/210) issued Sep. 7, 2022 by the International Searching Authority in International Patent Application No. PCT/KR2022/008100.

(Continued)

*Primary Examiner* — Ghazal B Shehni
(74) *Attorney, Agent, or Firm* — Sughrue Mion, PLLC

(57) ABSTRACT

An electronic device may include at least one wireless communication module configured to transmit and receive a wireless signal; a memory electrically configured to store instructions; and at least one processor operatively connected to the at least one wireless communication module and the memory, the at least one processor being configured to execute the instructions to: based on an attempt to connect to an access point (AP), identify whether a pairwise master key security association (PMKSA) for the AP, generated based on to a previous connection of the electronic device to the AP, is present, and based on identifying that the PMKSA is present, determine whether to reuse a pairwise master key (PMK) stored in the PMKSA by comparing a lifetime of the PMK with a margin time in which a use of the PMK is guaranteed.

20 Claims, 13 Drawing Sheets

(58) Field of Classification Search
CPC ... H04W 12/069; H04W 12/50; H04W 12/61; H04W 84/12
See application file for complete search history.

(56) References Cited

U.S. PATENT DOCUMENTS

| | | | |
|---|---|---|---|
| 2016/0295409 A1* | 10/2016 | Lee | H04W 12/04 |
| 2017/0019785 A1 | 1/2017 | Liu et al. | |
| 2017/0265069 A1* | 9/2017 | Palanigounder | H04W 36/14 |
| 2020/0236543 A1 | 7/2020 | Palanigounder et al. | |
| 2020/0267541 A1 | 8/2020 | Huang et al. | |
| 2023/0033287 A1* | 2/2023 | Agarwal | H04W 36/0038 |

FOREIGN PATENT DOCUMENTS

| | | |
|---|---|---|
| KR | 10-0704675 B1 | 4/2007 |
| KR | 10-1880480 B1 | 8/2018 |
| KR | 10-2145576 B1 | 8/2020 |

OTHER PUBLICATIONS

Communication issued on Oct. 11, 2024 by the European Patent Office in European Patent Application No. 22855986.0.
Anonymous Johannes, "cgf80211: Configure PMK lifetime and reauth threshold for PMKSA entries—Patchwork", Mar. 12, 2020, pp. 1-5, XP093247449, https://patchwork.kernel.org/project/linux-wireless/patch/20200312235903.18462-1-jouni@codeaurora.org/.
European Extended Search Report issued Feb. 18, 2025 by the European Patent Office for EP Patent Application No. 22855986.0.

* cited by examiner

ELECTRONIC DEVICE AND METHOD OF USING PAIRWISE MASTER KEY

CROSS-REFERENCE TO RELATED APPLICATIONS

This application is a continuation application of International Application No. PCT/KR2022/008100 designating the United States, filed on Jun. 9, 2022, in the Korean Intellectual Property Receiving Office and claiming priority to Korean Patent Application No. 10-2021-0104383, filed on Aug. 9, 2021, in the Korean Intellectual Property Office, the disclosures of which are incorporated by reference herein in their entireties.

BACKGROUND

1. Field

The disclosure relates to an electronic device and a method of using a pairwise master key (PMK).

2. Description of Related Art

Wireless fidelity (Wi-Fi) is a wireless local area network (WLAN) technology that enables access of the Internet in a frequency band of 2.4 gigahertz (GHz), 5 GHz, or 60 GHz. Wi-Fi protected access (WPA) is a standard-based security solution that solves a vulnerability of the WLAN. WPA provides improved data protection and access control for the WLAN system. WPA solves many known wired equivalent privacy (WEP) vulnerabilities in the IEEE 802.11 security implementation and provides an immediate security solution to the WLAN in a company, a small office, and a home office environment.

WPA2 and WPA3 are protocols exchanging an encryption key between an access point (AP) and a station (STA), and are recommended by the Wi-Fi Alliance. WPA3 is the latest Wi-Fi security protocol and provides a new function to improve the cybersecurity of a private network.

WPA3 improves general Wi-Fi encryption by replacing a WPA2-pre-shared key (PSK) through a simultaneous authentication of equals (SAE). SAE is a protocol designed to strongly and securely identify a peer device from another.

SUMMARY

When a station (STA) is connected to an access point (AP) of which a security type is set to Wi-Fi protected access (WPA)3-simultaneous authentication of equals (SAE), for the first time, the STA may generate a pairwise master key (PMK) by performing an SAE authentication operation and may store the PMK in a PMK security association (PMKSA). Thereafter, if a pre-stored PMKSA is present when the STA reconnects and/or roams to the AP, the STA may perform a connection operation following an SAE authentication operation, by using a PMK stored in the PMKSA without performing the SAE authentication operation again. If the PMKSA is present and a lifetime of the PMK stored in the PMKSA is greater than or equal to "0", the STA may reuse the PMKSA. If a remaining lifetime of the PMK is a few seconds, the STA may try to reuse the PMKSA. However, the PMKSA may not be used since the PMKSA expires in a few seconds. Accordingly, there is a demand for a technique to more efficiently use the PMK.

Various example embodiments may provide a technique to use a PMK based on a user's usage information on wireless communication.

The technical problem to be addressed by the present disclosure is not limited to the technical problem mentioned above, and other technical problems that may be addressed the present disclosure will be clearly understood by one of ordinary skill in the art from the following description.

According to an aspect of the disclosure, an electronic device includes: at least one wireless communication module configured to transmit and receive a wireless signal; a memory electrically configured to store instructions; and at least one processor operatively connected to the at least one wireless communication module and the memory, the at least one processor being configured to execute the instructions to: based on an attempt to connect to an access point (AP), identify whether a pairwise master key security association (PMKSA) for the AP, generated based on to a previous connection of the electronic device to the AP, is present, and based on identifying that the PMKSA is present, determine whether to reuse a pairwise master key (PMK) stored in the PMKSA by comparing a lifetime of the PMK with a margin time in which a use of the PMK is guaranteed.

According to an aspect of the disclosure, an electronic device includes: at least one wireless communication module configured to transmit and receive a wireless signal; a memory configured to store instructions; and at least one processor operatively connected to the at least one wireless communication module and the memory, the at least one processor being configured to execute the instructions to: generate a pairwise master key (PMK) based on a connection to an access point (AP), generate a PMK security association (PMKSA) for the AP, adjust a default value of a lifetime of the PMK, based on usage information on wireless communication supported by the AP, and store an adjusted value of the lifetime of the PMK in the PMKSA.

According to an aspect of the disclosure, an operating method of an electronic device, includes: based on the electronic device attempting to connect to an access point (AP), identifying whether a pairwise master key security association (PMKSA) for the AP, generated based on a previous connection of the electronic device to the AP, is present; and based on identifying that the PMKSA is present, determining whether to reuse a pairwise master key (PMK) stored in the PMKSA by comparing a lifetime of the PMK with a margin time in which a use of the PMK is guaranteed.

According to various example embodiments, the frequency of disconnection from wireless communication may decrease for a user and user inconvenience may be minimized by efficiently using a PMK based on the user's usage information on wireless communication.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
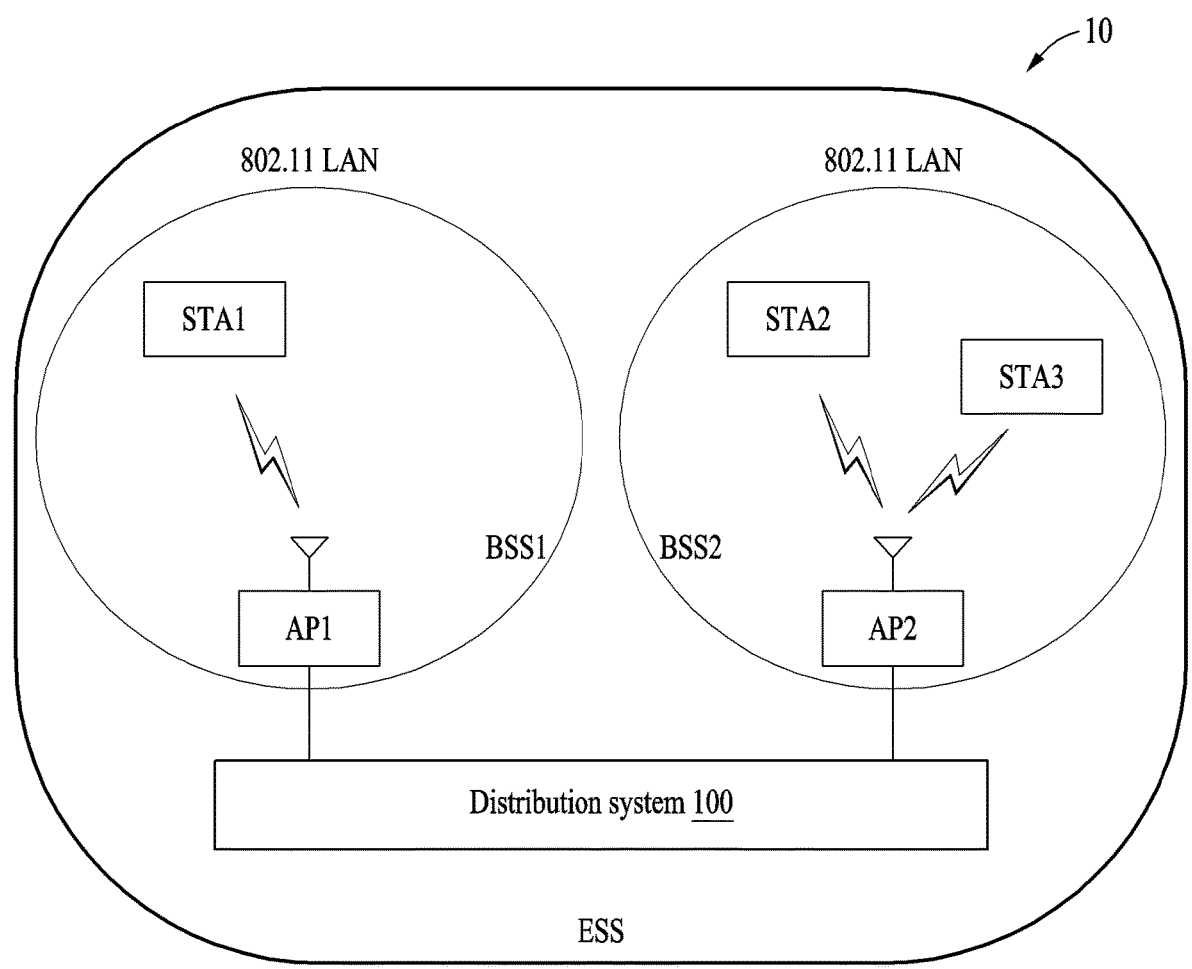
FIG. 1 is a diagram illustrating an example of a wireless local area network (WLAN) system, according to various example embodiments.

Hereinafter, example embodiments will be described in detail with reference to the accompanying drawings. When describing the example embodiments with reference to the accompanying drawings, like reference numerals refer to like constituent elements and a repeated description related thereto will be omitted.

FIG. 1 illustrates a diagram of an example of a wireless local area network (WLAN) system according to various example embodiments.

Figure 13:
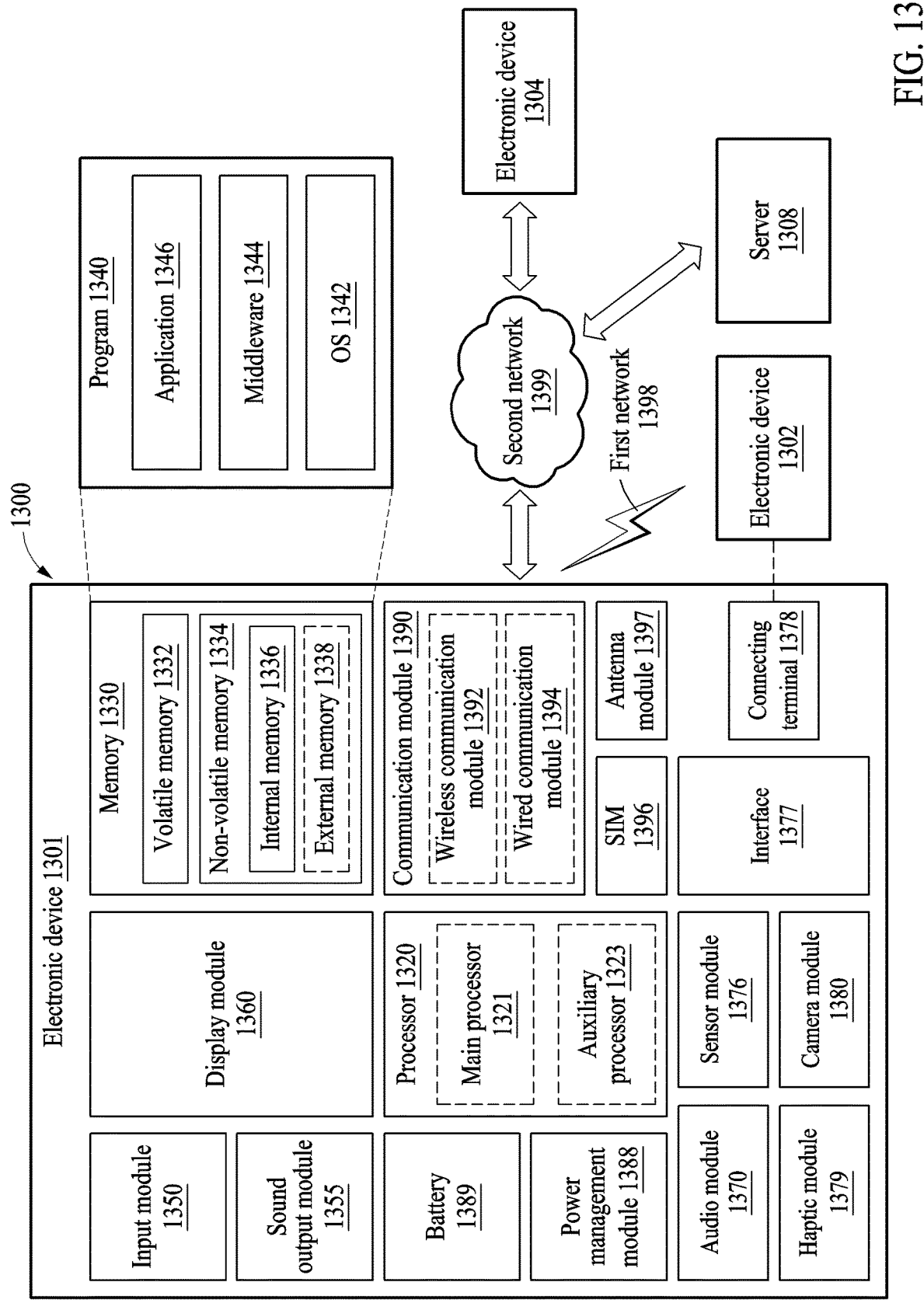
FIG. 13 is a block diagram illustrating an electronic device in a network environment, according to various example embodiments.

Referring to FIG. 1, according to various example embodiments, a WLAN system 10 may be in an infrastructure mode in which an access point (AP) is present in a WLAN structure conforming to an Institute of Electrical and Electronic Engineers (IEEE) 802.11 standard. The WLAN system 10 may include at least one basic service set (BSS), for example, BSS1 and BSS2. The BSS1 or BSS2 may be a set of an AP and a station (STA) (e.g., an electronic device 1301, 1302, or 1304 such as illustrated in FIG. 13), which may successfully synchronize with each other to communicate with each other. The BSS1 may include a single AP (for example, AP1) and a single STA (for example, STA1), and the BSS2 may include two or more STAs, (for example, STA2 and STA3) that may be combined with one AP (for example, AP2).

According to various example embodiments, the WLAN system 10 may include at least one STA (e.g., STA1 to STA3), an AP (e.g., AP1 and AP2) that provides a distribution service, and a distribution system 100 that connects a plurality of APs (e.g., AP1 and AP2). The distribution system 100 may implement an extended service set (ESS) by connecting a plurality of BSSs (e.g., BSS1 and BSS2). The ESS may be used as a term to denote one network including one or more APs (e.g., AP1 and AP2) connected via the distribution system 100. The APs (e.g., AP1 and AP2) included in one ESS may have the same service set identification (SSID).

According to various example embodiments, the STAs (e.g., STA1 to STA3) may include a medium access control (MAC) and a wireless-medium physical layer interface conforming to the IEEE 802.11 standard. The term "STA" may be used to collectively refer to both an AP and a non-AP STA. The STA may also be referred to by various terms, such as an "electronic device", a "mobile terminal", a "wireless device", a "wireless transmit/receive unit (WTRU) ", a "user equipment (UE)", a "mobile station (MS)", and a "mobile subscriber unit", or may simply referred to as a "user".

Figure 2:
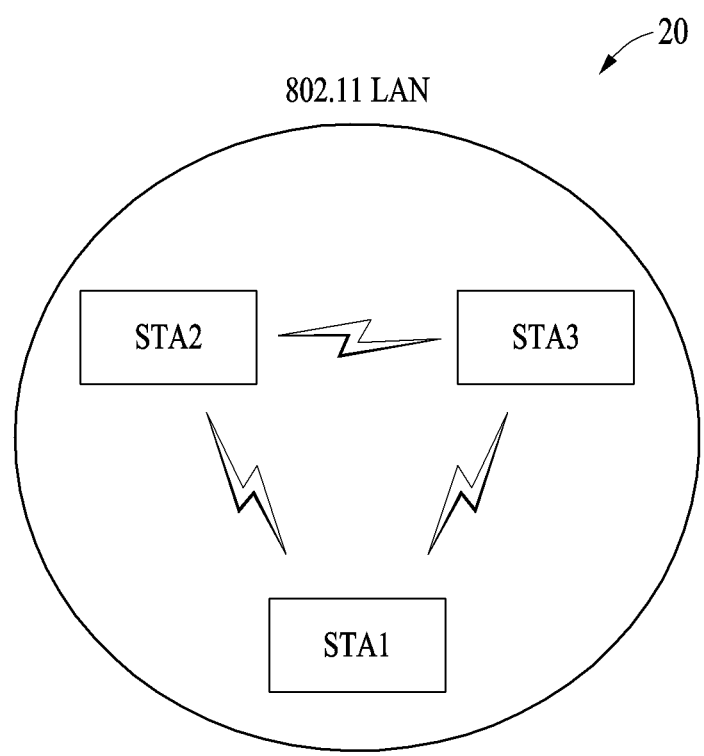
FIG. 2 is a diagram illustrating another example of a WLAN system, according to various example embodiments.

FIG. 2 illustrates a diagram of another example of a WLAN system according to various example embodiments.

Referring to FIG. 2, according to various example embodiments, a WLAN system 20 may be in an ad-hoc mode in which communication is performed by setting a network between STAs without an AP in a structure of a WLAN of the IEEE 802.11 standard, unlike the WLAN system 10 of FIG. 1. The WLAN system 20 may include a BSS operating in an ad-hoc mode, that is, an independent basic service set (IBSS).

According to various example embodiments, since the IBSS does not include an AP, a centralized management entity that performs a management function at a center may not exist. In the IBSS, STAs may be managed in a distributed manner. In the IBSS, all STAs may be mobile STAs, and a stand-alone network (or, a self-contained network) may be configured since an access to a distribution system (e.g., the distribution system 100 of FIG. 1) is not allowed.

Figure 3:
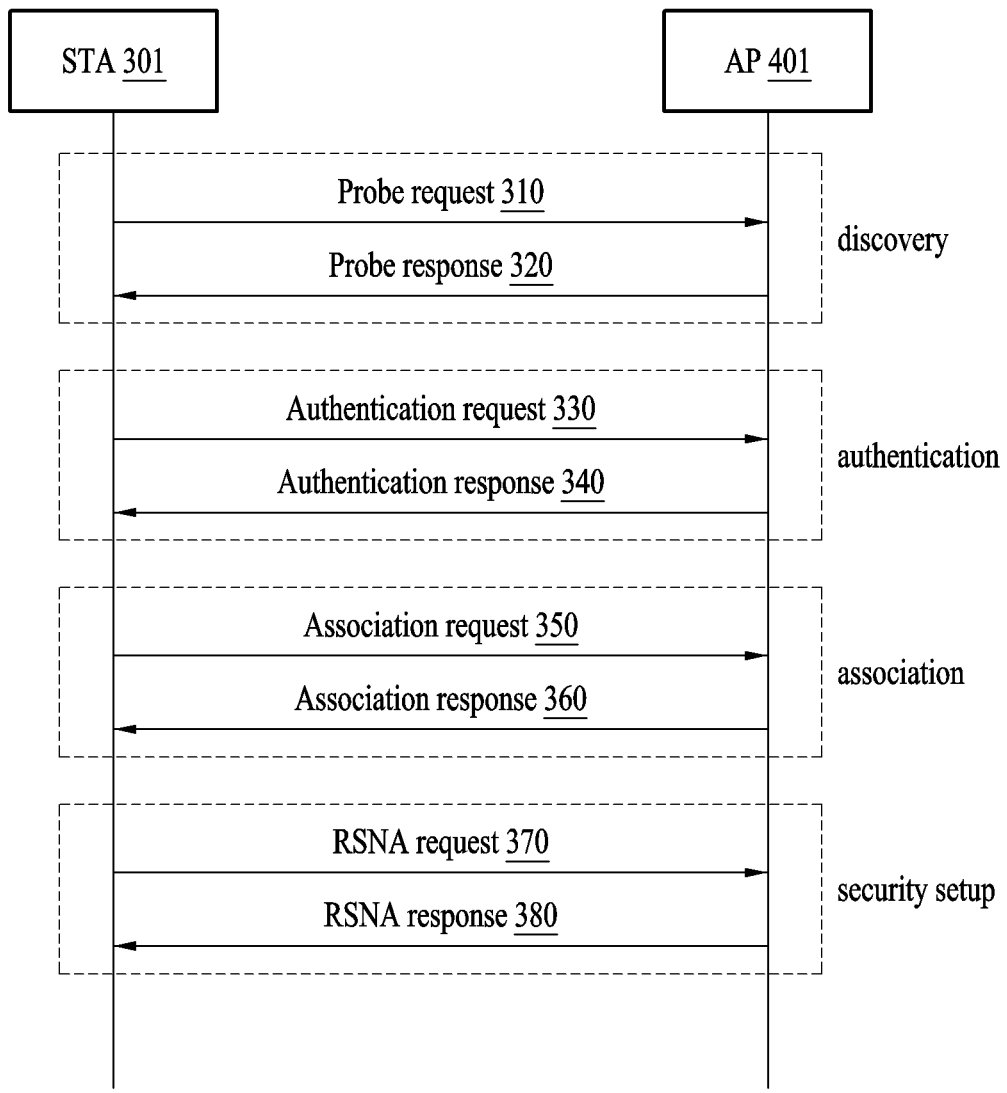
FIG. 3 is a flow diagram illustrating an example of a link setup operation, according to various example embodiments.

FIG. 3 illustrates a flow diagram of an example of a link setup operation, according to various example embodiments.

Referring to FIG. 3, according to various example embodiments, a link setup operation may be performed between devices (e.g., an STA 301 and an AP 401) to communicate with each other. For link setup, operations of discovering a network, performing authentication, establishing association, and setting a security may be performed. The link setup operation may also be referred to as a "session initiation operation" or a "session setup operation". In addition, discovery, authentication, association, and security setup operations in the link setup operation may be collectively referred to as an "association operation".

According to various example embodiments, a network discovery operation may include operations 310 and 320. In operation 310, the STA 301 (e.g., the electronic device 1301, 1302, or 1304 of FIG. 13) may transmit a probe request frame to probe which AP is present, and may wait for a response to the probe request frame. The STA 301 may find a network to participate in by performing a scanning operation to access the network. The scanning operation may include an active scanning operation and a passive scanning operation. In operation 320, the AP 401 may transmit, to the STA 301 that transmits the probe request frame, a probe response frame in response to the probe request frame.

According to various example embodiments, after the STA 301 discovers the network, an authentication operation including operations 330 and 340 may be performed. In operation 330, the STA 301 may transmit an authentication request frame to the AP 401. In operation 340, the AP 401 may determine whether to allow authentication for the STA 301, based on information included in the authentication request frame. The AP 401 may provide the STA 301 with a result of an authentication process through an authentication response frame. An authentication frame used for authentication request/response may correspond to a management frame.

According to various example embodiments, the authentication frame may include information on an authentication algorithm number, an authentication transaction sequence number, a status code, challenge text, a robust security network (RSN), a finite cyclic group, and the like.

According to various example embodiments, after the STA 301 has successfully authenticated, an association operation including operations 350 and 360 may be performed. In operation 350, the STA 301 may transmit an association request frame to the AP 401. In operation 360, the AP 401 may transmit an association response frame to the STA 301, in response to the association request frame.

According to various example embodiments, the association request frame and/or the association response frame may include information related to various capabilities. For example, the association request frame may include information related to various capabilities, such as a beacon listen interval, an SSID, a supported rate, a supported channel, an RSN, a mobility domain, a supported operating class, a traffic indication map (TIM) broadcast request, and/or information related to an interworking service capability. For example, the association response frame may include information related to various capabilities, such as a status code, an association ID (AID), a supported rate, an enhanced distributed channel access (EDCA) parameter set, a received channel power indicator (RCPI), a received signal to noise indicator (RSNI), a mobility domain, a timeout interval (e.g., an association comeback time), an overlapping BSS scan parameter, a TIM broadcast response, and/or information, such as a Quality of Service (QoS) map.

According to various example embodiments, after the STA 301 has successfully associated with the network, a security setup operation including operations 370 and 380 may be performed. The security setup operation may be performed using a robust security network association (RSNA) request frame and/or an RSNA response frame. For example, the security setup operation may include a private key setup operation through four-way handshaking using an extensible authentication protocol over LAN (EAPOL) frame. The security setup operation may be performed by a security scheme that is not defined in the IEEE 802.11 standard.

According to various example embodiments, a security session may be set between the STA 301 and the AP 401 based on the security setup operation and the STA 301 and the AP 401 may perform secure data communication.

Figure 4:
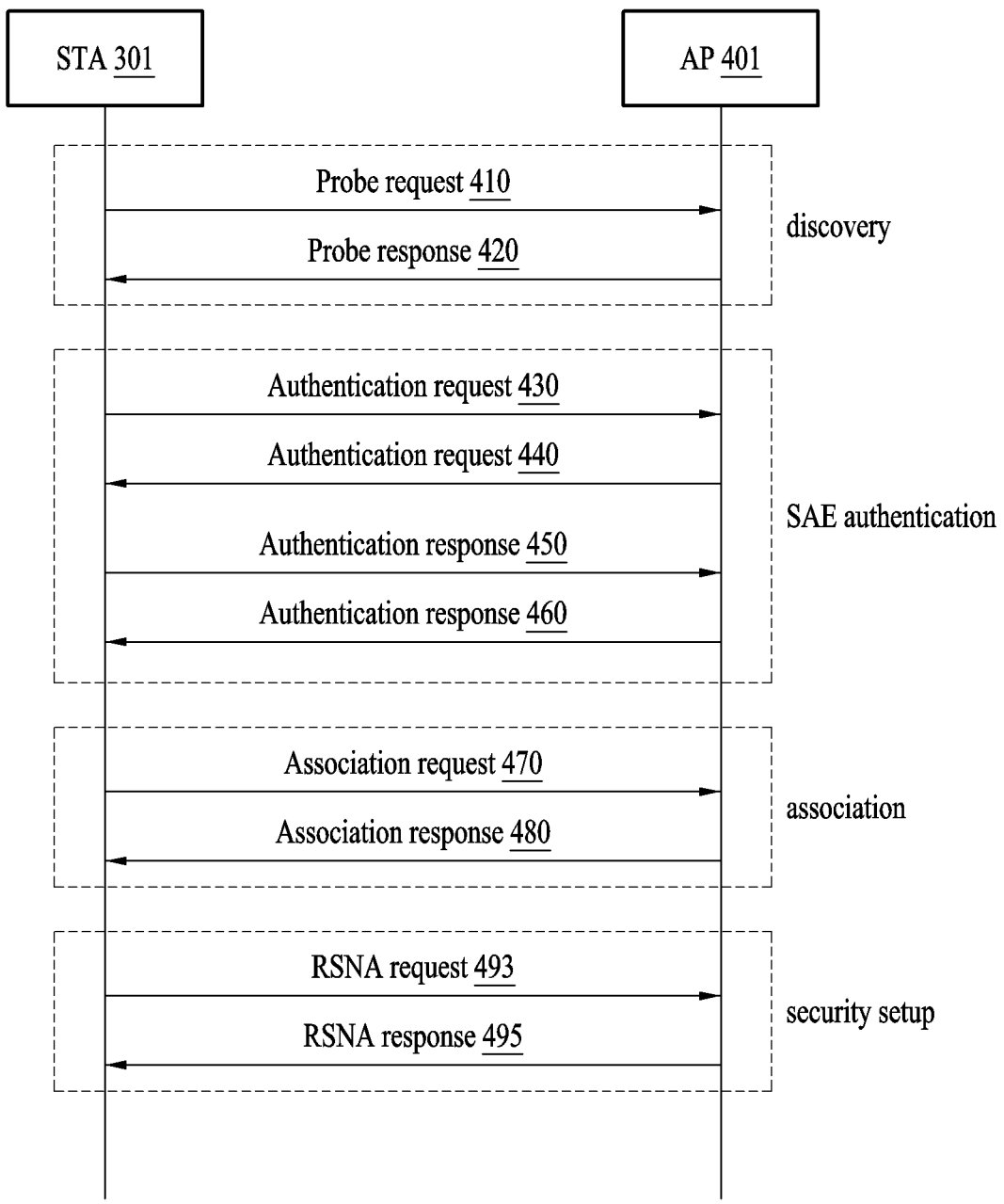
FIG. 4 is a flow diagram illustrating another example of a link setup operation, according to various example embodiments.

FIG. 4 illustrates a flow diagram of another example of a link setup operation, according to various example embodiments.

Referring to FIG. 4, a link setup operation including a simultaneous authentication of equals (SAE) protocol may be performed between devices (e.g., the STA 301 and the AP 401) to communicate with each other. In the link setup operation of FIG. 4, an SAE authentication operation may be performed based on the SAE protocol.

According to various example embodiments, a network discovery operation may include operations 410 and 420. In operation 410, the STA 301 (e.g., the electronic device 1301, 1302, or 1304 of FIG. 13) may transmit a probe request frame to probe which AP is present and may wait for a response to the probe request frame. The STA 301 may find a network to participate in by performing a scanning operation to access the network. The scanning operation may include an active scanning operation and a passive scanning operation. In operation 420, the AP 401 may transmit, to the STA 301 that transmits the probe request frame, a probe response frame in response to the probe request frame.

According to various example embodiments, after the STA 301 discovers the network, an authentication operation including operations 430 to 460 may be performed based on the SAE protocol. The SAE protocol may include an operation of exchanging two messages (e.g., an authentication commit message and an authentication confirm message). The authentication commit message may be an encryption key used for compelling each of the devices (e.g., the STA 301 and the AP 401) to guess a password (e.g., a password that conforms to the WPA3 standard and is used as an encryption key when performing key exchange and/or authentication compliant to the IEEE 802.11 standard) only once, and the authentication confirm message may be used to prove that password guess was correct. The authentication frame may be used for performing message exchange based on the SAE protocol.

According to various example embodiments, in operation 430, the STA 301 may transmit an authentication request frame to the AP 401, and in operation 440, the AP 401 may transmit an authentication request frame to the STA 301. The authentication request frame may include an authentication commit message including commit-scalar and COMMIT-ELEMENT. The device (e.g., the STA 301 and the AP 401) may calculate commit-scalar and COMMIT-ELEMENT by using a password element (PWE), which is a secret element, and two secret values (e.g., rand and mask). commit-scalar and COMMIT-ELEMENT may be calculated by Equations 1 and 2, respectively.

$$\text{commit-scalar} = (\text{rand} + \text{mask}) \bmod r \quad \text{[Equation 1]}$$

$$\text{COMMIT-ELEMENT} = \text{inverse}(\text{scalar-op}(\text{mask}, \text{PWE})) \quad \text{[Equation 2]}$$

According to the various example embodiments, a device (e.g., the STA 301 and the AP 401) may generate a PWE and two secret values (e.g., rand and mask), before exchanging an SAE protocol message. The PWE may be generated for a corresponding group (e.g., an elliptic curve cryptography (ECC) group or a finite field cryptography (FFC) group). The device (e.g., the STA 301 and the AP 401) may generate the PWE by using ECC. In addition, generating the PWE may further use a password and/or a password identifier. After generating the PWE, the device (e.g., the STA 301 and the AP 401) may generate a secret value (e.g., rand) and a temporary secret value (e.g., mask). The secret value (e.g., rand) and the temporary secret value (e.g., mask) may be $1 < \text{rand} < r$ and $1 < \text{mask} < r$, respectively, and may be generated such that $(\text{rand} + \text{mask}) \bmod r$ is greater than 1. Here, r may be an order (e.g., a prime order) of a group. The secret value (e.g., rand) and the temporary secret value (e.g., mask) may respectively be random numbers generated by a quality random number drawn from a uniform distribution generator. These values (e.g., rand and mask) may not be reused for performing a unique protocol. In operations 430 and 440, the temporary secret value (e.g., mask) may be removed when the authentication commit message is transmitted.

According to various example embodiments, in operation 450, the STA 301 may transmit, to the AP 401, an authentication response frame including an authentication confirm message, in response to the authentication request frame. According to various example embodiments, in operation 460, the AP 401 may transmit an authentication response frame including an authentication confirm message to the STA 301, in response to the authentication request frame.

The device (e.g., the STA 301 and the AP 401) may generate a pairwise master key (PMK) when the device receives the authentication request frame. Before generating the PMK, the device (e.g., the STA 301 and the AP 401) may perform validity verification on commit-scalar and COMMIT-ELEMENT included in the authentication commit message. When the device (e.g., the STA 301 and the AP 401) successfully completes the validity verification on commit-scalar and COMMIT-ELEMENT, the device may generate the PMK. Hereinafter, commit-scalar and COMMIT-ELEMENT received by the device (e.g., the STA 301 and the AP 401) are referred to as peer-commit-scalar and peer-COMMIT-ELEMENT, respectively, and an operation of generating a PMK is described.

According to various example embodiments, the device (e.g., the STA 301 and the AP 401) may calculate a shared secret element (e.g., K). The shared secret element K may be derived by using peer-commit-scalar, peer-COMMIT-ELEMENT, and a secret value (e.g., rand), which are included in the received authentication commit message. The shared secret element K may be calculated by Equation 3.

$$K=\text{scalar-op}(\text{rand},(\text{elem-op}(\text{scalar-op}(\text{peer-commit-scalar},\text{PWE}),\text{PEER-COMMIT-ELEMENT}))) \quad \text{[Equation 3]}$$

The device (e.g., the STA 301 and the AP 401) may calculate a secret value (e.g., k) by the calculated shared secret element K. The secret value k may be calculated using Equation 4, where the function F may be a function that returns $F(K)=x$, in response to $K=(x, y)$.

$$k=F(K) \quad \text{[Equation 4]}$$

The device (e.g., the STA 301 and the AP 401) may calculate a keyseed using the calculated secret value k. The keyseed may be calculated by Equation 5. Here, <0>32 may denote a configuration in 32 octets of a value 0. The device (e.g., the STA 301 and the AP 401) may calculate a hash value using <0>32 and the secret value k as variables.

$$\text{keyseed}=H(<0>32,k) \quad \text{[Equation 5]}$$

The device (e.g., the STA 301 and the AP 401) may calculate kck_and_pmk by using the keyseed. kck_and_pmk may be calculated by Equation 6. KDF-Hash-512( ) may be a key derivation function, and a character string "SAE KCK and PMK" may be a character string to identify a purpose of a key derived by the key derivation function.

$$\text{kck\_and\_pmk}=\text{KDF-Hash-512}(\text{keyseed},\text{"SAE KCK and PMK"},(\text{commit-scalar}+\text{peer-commit-scalar}) \bmod r) \quad \text{[Equation 6]}$$

The device (e.g., the STA 301 and the AP 401) may calculate a key confirmation key (KCK) and a PMK by kck_and_pmk. The KCK may be calculated by Equation 7 and the PMK may be calculated by Equation 8. Calculation results of the KCK and the PMK may be 256 bits. For example, the KCK may be calculated from 0 bits to 255 bits (e.g., initial 256 bits) of kck_and_pmk, and the PMK may be calculated from 256 bits to 511 bits (e.g., the next 256 bits) of kck_and_pmk.

$$\text{KCK}=L(\text{kck\_and\_pmk},0,256) \quad \text{[Equation 7]}$$

$$\text{PMK}=L(\text{kck\_and\_pmk},256,256) \quad \text{[Equation 8]}$$

After the PMK is generated, the device (e.g., the STA 301 and the AP 401) may generate an authentication confirm message and may transmit an authentication response frame including the authentication confirm message. The authentication confirm message may include "confirm". The device (e.g., the STA 301 and the AP 401) may generate "confirm" by using Equation 9.

$$\text{confirm}=\text{CN}(\text{KCK},\text{send-confirm},\text{commit-scalar},\text{COMMIT-ELEMENT},\text{peer-commit-scalar},\text{PEER-COMMIT-ELEMENT}) \quad \text{[Equation 9]}$$

In Equation 9, send-confirm, commit-scalar, and COMMIT-ELEMENT may be calculated by a device (e.g., the STA 301 or the AP 401) that receives the authentication request frame. send-confirm and commit-scalar may be calculated by using the secret value (e.g., rand) and the temporary secret value (e.g., mask) determined by the device (e.g., the STA 301 and the AP 401) that receives the authentication request frame. The send-confirm may be a value of a counter used in SAE as a replay prevention counter. CN( ) may be a confirmation function that calculates the hash value.

According to various example embodiments, the device (e.g., the STA 301 and the AP 401) may authenticate the other device (e.g., the STA 301 and the AP 401), in response to the authentication response frame. When the device (e.g., the STA 301 and the AP 401) receives the authentication response frame, the device may calculate the KCK and may perform authentication by using Equation 10. The devices (e.g., the STA 301 and the AP 401) may authenticate each other by comparing "confirm" and "verifier". For example, if "confirm" and "verifier" correspond to each other, the devices (e.g., the STA 301 and the AP 401) may accept authentication with respect to each other. The STA 301 may accept authentication from the AP 401 and may set a lifetime of the PMK to a default value (e.g., dot11RSNAConfigPMKLifetime).

$$\text{verifier}=\text{CN}(\text{KCK},\text{peer-send-confirm},\text{peer-commit-scalar},\text{PEER-COMMIT-ELEMENT},\text{commit-scalar},\text{COMMIT-ELEMENT}) \quad \text{[Equation 10]}$$

According to various example embodiments, the device (e.g., the STA 301 and the AP 401) may generate a PMK and a PMK identifier (PMKID). The PMKID may be defined by Equation 11.

$$\text{PMKID}=L((\text{commit-scalar}+\text{peer-commit-scalar}) \bmod r,0,128) \quad \text{[Equation 11]}$$

The device (e.g., the STA 301 and the AP 401) may generate (e.g., set) a PMK security association (PMKSA). The PMKSA may be generated for each peer that performs communication and may be stored. The PMKSA may store information, such as the PMK, the PMKID, the lifetime of the PMK, a MAC address of an authenticator (e.g., a peer MAC address), an authentication and key management protocol, a FILS Cache ID, and a network configuration context (e.g., an SSID). Since a lifetime of the PMK is set to a default value, a lifetime of the PMKSA may also be set to the default value of the lifetime of the PMK. When the PMK has expired as the lifetime of the PMK becomes "0", the PMKSA may expire.

According to various example embodiments, after the STA 301 has successfully authenticated, an association operation including operations 470 and 480 may be performed. In operation 470, the STA 301 may transmit an association request frame to the AP 401. In operation 480, the AP 401 may transmit an association response frame to the STA 301, in response to the association request frame.

According to various example embodiments, the association request frame and/or the association response frame may include information related to various capabilities. For example, the association request frame may include information related to various capabilities, such as a beacon listen interval, an SSID, a supported rate, a supported channel, an RSN, a mobility domain, a supported operating class, a TIM broadcast request, and/or information related to an interworking service capability. For example, the association response frame may include information related to various capabilities, such as a status code, an AID, a supported rate, an EDCA parameter set, an RCPI, an RSNI, a mobility domain, a timeout interval (e.g., an association comeback time), an overlapping BSS scan parameter, a TIM broadcast response, and/or information, such as a QoS map.

According to various example embodiments, after the STA 301 has successfully associated with the network, a security setup operation including operations 493 and 495 may be performed. The security setup operation may be performed based on the PMK generated according to the SAE protocol in operations 430 to 460. The security setup operation may be performed using an RSNA request frame and/or an RSNA response frame. For example, the security setup operation may include a private key setup operation through four-way handshaking using an EAPOL frame. The security setup operation may be performed by a security scheme that is not defined in the IEEE 802.11 standard.

According to various example embodiments, a security session may be set between the STA 301 and the AP 401 based on the security setup operation and the STA 301 and the AP 401 may perform secure data communication.

Figure 5:
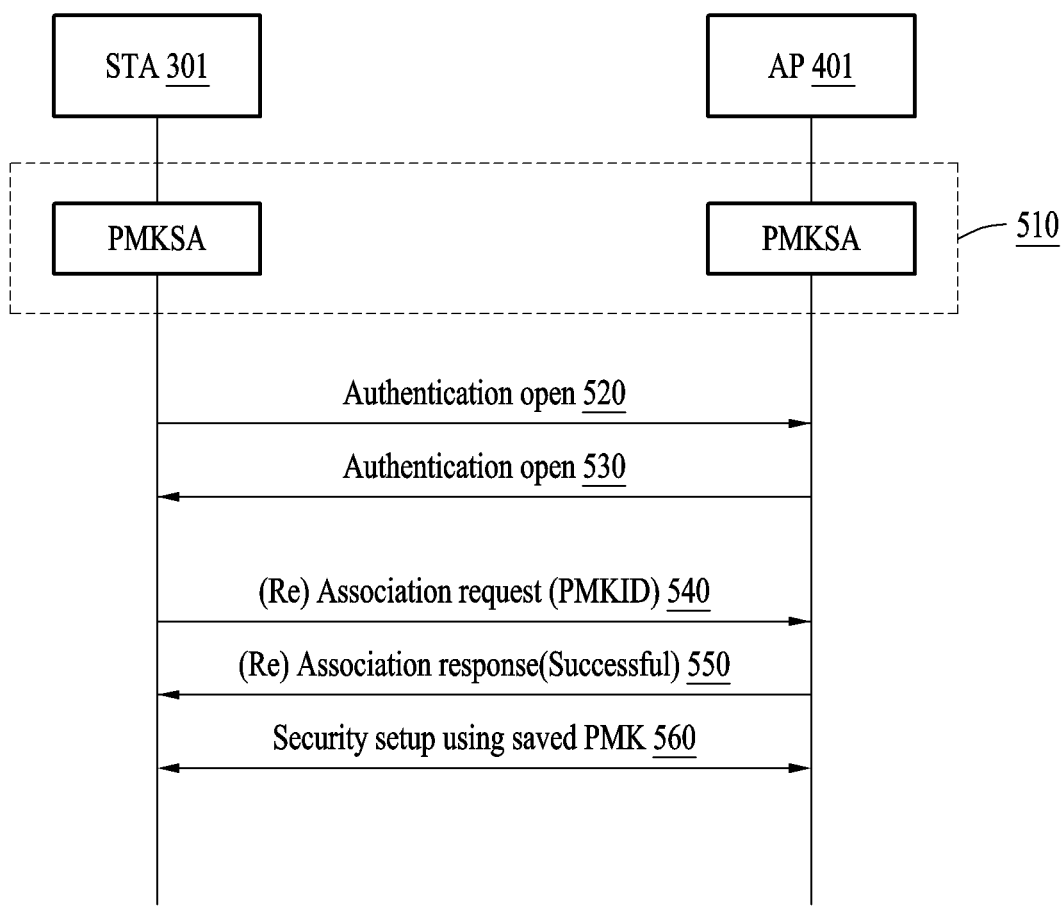
FIG. 5 is a flow diagram illustrating an example of a method of using a pairwise master key (PMK), according to various example embodiments.

FIG. 5 illustrates a flow diagram of an example of a method of using a pairwise master key (PMK), according to various example embodiments.

Referring to FIG. 5, according to various example embodiments, when the STA 301 is connected to the AP 401 (e.g., a first connection), the STA 301 may perform a PMK caching operation that reuses a PMK generated according to the SAE protocol. A lifetime of the PMK may be set to a default value, and the PMK may be used when the STA 301 reconnects and/or roams (e.g., a second connection) to the AP 401 since the PMK does not expire during a time set by the default value. The first connection may be connection when the STA 301 is connected to the AP 401 and generates the PMK according to the SAE protocol, and the second connection may be connection after the first connection. Hereinafter, the PMK caching operation that reuses the PMK is described.

In operation 510, when the STA 301 is connected to the AP 401, the STA 301 may generate a PMK according to the SAE protocol and may store the PMK in a PMKSA for the AP 401. Since the lifetime of the PMK is set to a default value, a lifetime of the PMKSA may also be set to the default value of the lifetime of the PMK. For example, when the PMK has expired as the lifetime of the PMK becomes "0", the PMKSA may expire. In operation 510, the AP 401 may also generate a PMK according to the SAE protocol and may store the PMK in a PMKSA for the STA 301.

In operation 520, the STA 301 may perform open authentication (e.g., 802.11 Authentication Open) after identifying that the PMKSA for the AP 401 is present. When the STA 301 attempts to reconnect to the AP 401 after being disconnected from the AP 401 or attempts to roam again to the AP 401 after roaming to another AP, the STA 301 may determine whether the PMKSA, which is generated when the STA 301 is connected to the AP 401, for the AP 401 is present (e.g., whether the PMK is present). For ease of description, FIG. 5 is described based on an assumption that the PMK, which is generated when the STA 301 is connected to the AP 401, is present in the STA 301 and the AP 401.

In operation 530, the AP 401 may also perform open authentication (e.g., 802.11 Authentication Open), like the STA 301.

In operation 540, the STA 301 may transmit, to the AP 401, an association request frame including a PMKID, after performing open authentication. The PMKID may be stored in the PMKSA for the AP 401.

In operation 550, the AP 401 may receive the association request frame and may identify whether the PMKSA for the STA 301 is present by using the PMKID included in the association request frame. After identifying that the PMKSA for the STA 301 is present, the AP 401 may transmit an association response frame to the STA 301.

In operation 560, after the STA 301 has successfully associated with the AP 401, a security setup operation (e.g., operations 493 and 495 of FIG. 4) may be performed based on the PMK stored in the PMKSA. For example, a private key setup process may be performed by performing four-way handshaking based on the PMK stored in the PMKSA.

According to various example embodiments, when the STA 301 reconnects and/or roams again to the AP 401, the STA 301 may perform a connection to the AP 401 by using (e.g., reusing) the PMK stored in the PMKSA for the AP 401, without performing an SAE authentication operation (e.g., operations 430 to 460 of FIG. 4). Since the SAE authentication operation is omitted, an amount of packets exchanged between the STA 301 and the AP 401 for the SAE authentication operation may decrease, and thus, a load between the STA 301 and the AP 401 may significantly decrease as a computation operation included in the SAE authentication operation is also omitted.

Figure 6:
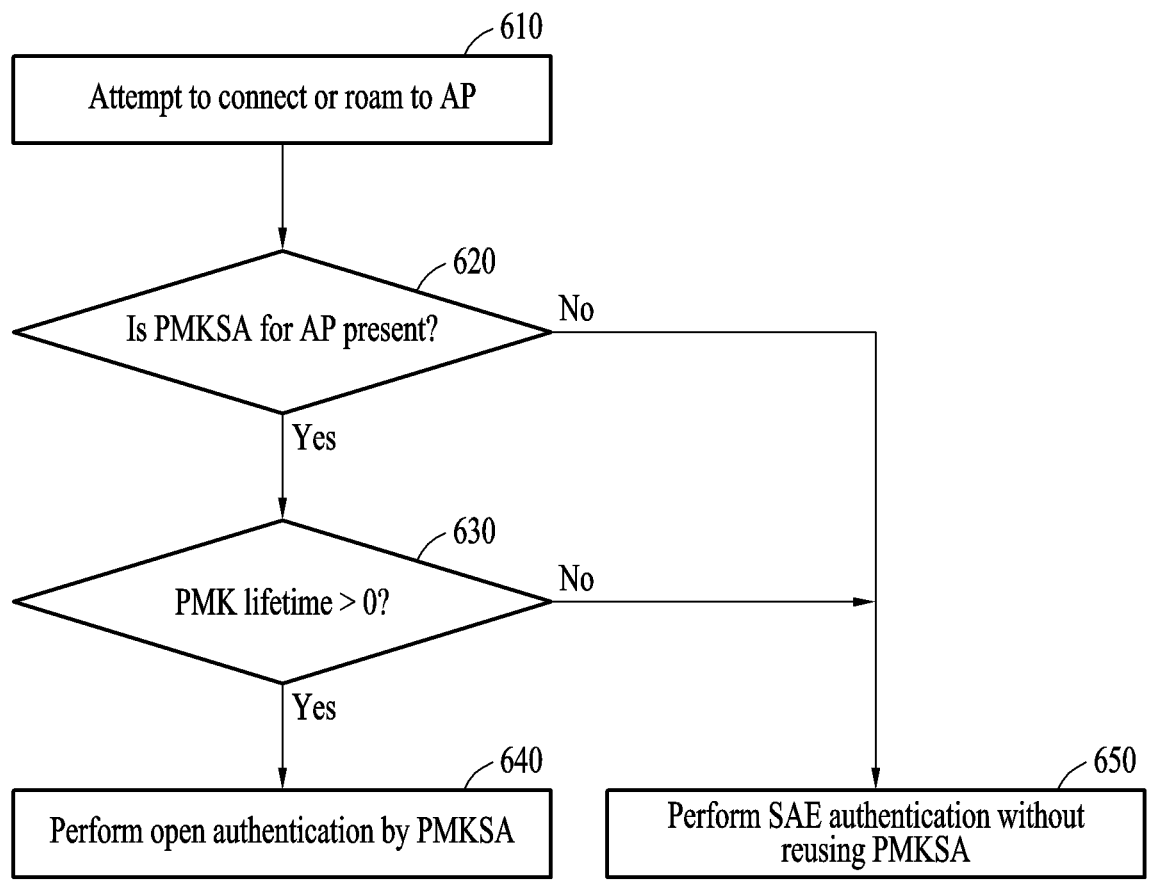
FIG. 6 is a flow diagram illustrating another example of a method of using a PMK, according to various example embodiments.

FIG. 6 illustrates a flow diagram of another example of a method of using a PMK, according to various example embodiments.

FIG. 6 may further describe the PMK caching operation that reuses the PMK described with reference to FIG. 5. FIG. 6 is described based on an assumption that the STA 301 has already connected to the AP 401 (e.g., the first connection).

In operation 610, after being disconnected from the AP 401, the STA 301 may attempt to reconnect (e.g., the second connection) to the AP 401 or attempt to roam again (e.g., the second connection) to the AP 401 after roaming to another AP.

In operation 620, the STA 301 may identify whether a PMKSA for the AP 401, which is generated when the STA 301 is connected to the AP 401, is present (e.g., whether a PMK is present).

In operation 630, when the PMKSA for the AP 401 is present, the STA 301 may determine whether a lifetime of the PMK stored in the PMKSA is greater than "0".

In operation 640, when the lifetime of the PMK is greater than "0", the STA 301 may perform open authentication (e.g., 802.11 Authentication Open) by reusing the PMKSA. The STA 301 may perform a connection to the AP 401 without performing an SAE authentication operation (e.g., operations 430 to 460 of FIG. 4). Here, the operation of performing the connection to the AP 401 may include operations 520 to 560 described with reference to FIG. 5.

In operation 650, when the PMKSA for the AP 401 is not present or the lifetime of the PMK is "0", the STA 301 may perform the SAE authentication operation without reusing the PMKSA. The STA 301 may perform an operation of connecting to the AP 401 by performing an SAE authentication operation for generating a new PMK. Here, the operation of connecting to the AP 401 may include operations 430 to 495 described with reference to FIG. 4.

According to various example embodiments, as shown in FIG. 5, if the PMKSA for the AP 401, to which the STA 301 reconnects or roams, is present and the lifetime of the PMK stored in the PMKSA is equal to or greater than "0", the STA 301 may reuse the PMK. In this case, the STA 301 may not use the PMK even if a current remaining lifetime is, for example, 5 seconds, and when the PMK becomes unusable as the PMK has expired after 5 seconds from the connection, the STA 301 may perform the connection to the AP 401 by performing the SAE authentication operation for generating the new PMK.

Figure 7:
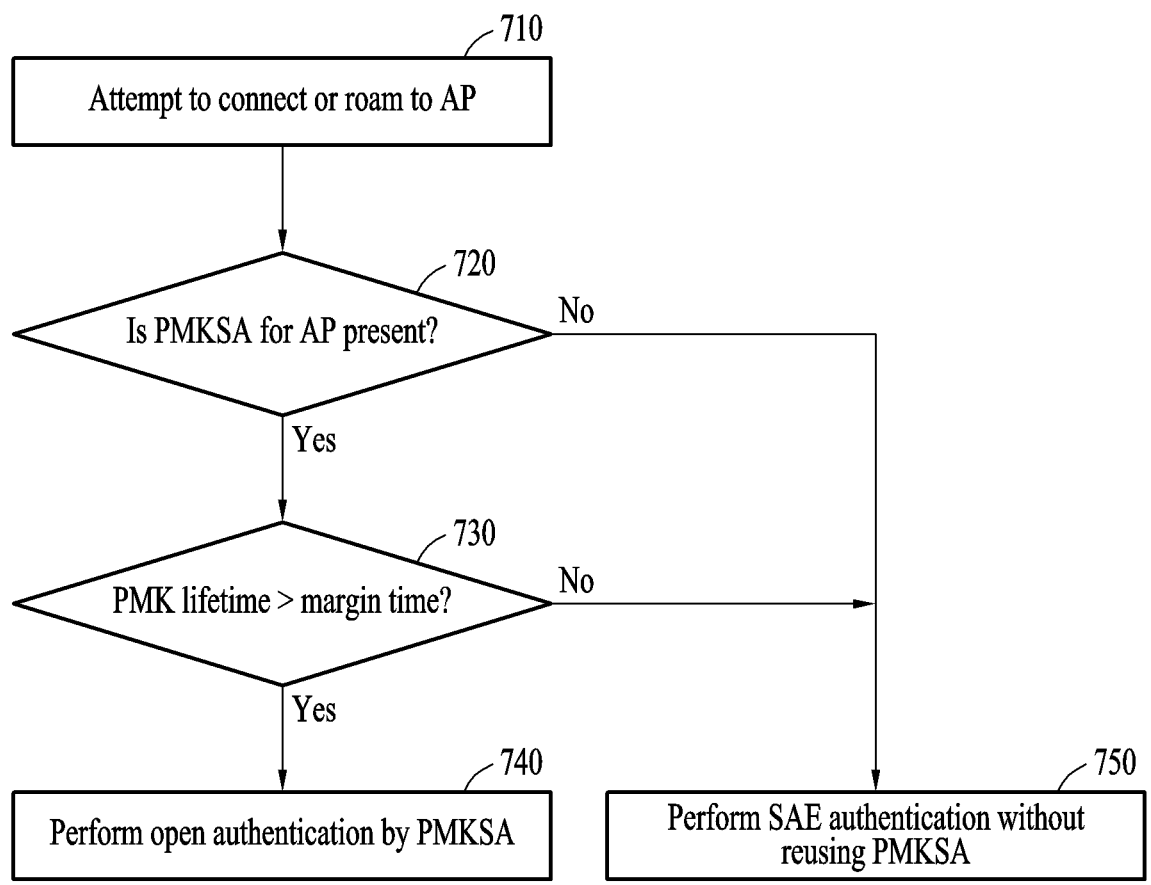
FIG. 7 is a flow diagram illustrating another example of a method of using a PMK, according to various example embodiments.

FIG. 7 illustrates a flow diagram of another example of a method of using a PMK, according to various example embodiments.

Referring to FIG. 7, according to various example embodiments, when the STA 301 reconnects and/or roams again to the AP 401, the STA 301 may perform a connection to the AP 401 by using (e.g., reusing) the PMK stored in the PMKSA for the AP 401, without performing an SAE authentication operation (e.g., operations 430 to 460 of FIG. 4). In FIG. 7, unlike FIG. 6, the STA 301 may reuse the PMK if a remaining lifetime of the PMK is greater than a margin time. FIG. 7 is described based on an assumption that the STA 301 has already connected to the AP 401 (e.g., the first connection).

In operation 710, after being disconnected from the AP 401, the STA 301 may attempt to reconnect (e.g., the second connection) to the AP 401 or attempt to roam again (e.g., the second connection) to the AP 401 after roaming to another AP.

In operation 720, the STA 301 may identify whether a PMKSA, which is generated when the STA 301 is connected to the AP 401, for the AP 401 is present.

In operation 730, if the PMKSA for the AP 401 is present, the STA 301 may determine whether to reuse the PMK by comparing the lifetime of the PMK stored in the PMKSA with the margin time and determining whether the lifetime of the PMK is greater than the margin time. The AP 401 may also generate a PMK according to the SAE protocol. The margin time may be a time in which the PMK does not expire and the use of the PMK is guaranteed while the STA 301 is connected to the AP 401. The margin time may be determined (e.g., set) based on a user's usage information on wireless communication (e.g., Wi-Fi) supported by the AP 401, the user being, for example, the user of the STA 301. The usage information of the user may include at least one of a Wi-Fi connection time and a Wi-Fi usage pattern of the user. For example, the Wi-Fi connection time of the user may include a connection time of the STA 301 to the AP 401 and the Wi-Fi usage pattern may include a usage time pattern of the STA 301 for the AP 401.

In operation 740, the STA 301 may perform open authentication (e.g., 802.11 Authentication Open) by reusing the PMKSA if the lifetime of the PMK is greater than the margin time. The STA 301 may perform a connection to the AP 401 without performing an SAE authentication operation (e.g., operations 430 to 460 of FIG. 4). Here, the operation of performing the connection to the AP 401 may include operations 520 to 560 described with reference to FIG. 5.

In operation 750, when the PMKSA for the AP 401 is not present or the lifetime of the PMK stored in the PMKSA is less than the margin time, the STA 301 may not use the PMKSA and may perform the SAE authentication operation without reusing the PMKSA. The STA 301 may perform an operation of connecting to the AP 401 by performing an SAE authentication operation for generating a new PMK. Here, the operation of connecting to the AP 401 may include operations 430 to 495 described with reference to FIG. 4. The STA 301 may generate a PMK according to the SAE protocol, and the AP 401 may also generate a PMK according to the SAE protocol.

According to various example embodiments, one value may be used for the margin time for the STA 301. In addition, the margin time may be determined and used for each device, user, SSID, and/or basic SSID (BSSID).

According to various example embodiments (not shown), the STA 301 may dynamically change the margin time based on usage information (e.g., latest usage information) of a user. The usage information of the user may be substantially the same as the usage information described in operation 730.

According to various example embodiments, if the PMKSA for the AP 401, to which the STA 301 reconnects or roams, is present and the lifetime of the PMK stored in the PMKSA is equal to or greater than the margin time, the STA 301 may reuse the PMK. Since the PMK stored in the PMKSA does not expire during the margin time, the STA 301 may not be disconnected from the AP 401 during the margin time as the PMK is in use. Accordingly, inconvenience to the user may be minimized by decreasing a frequency of disconnection since the STA 301 may more efficiently use the stored PMK.

Figure 8:
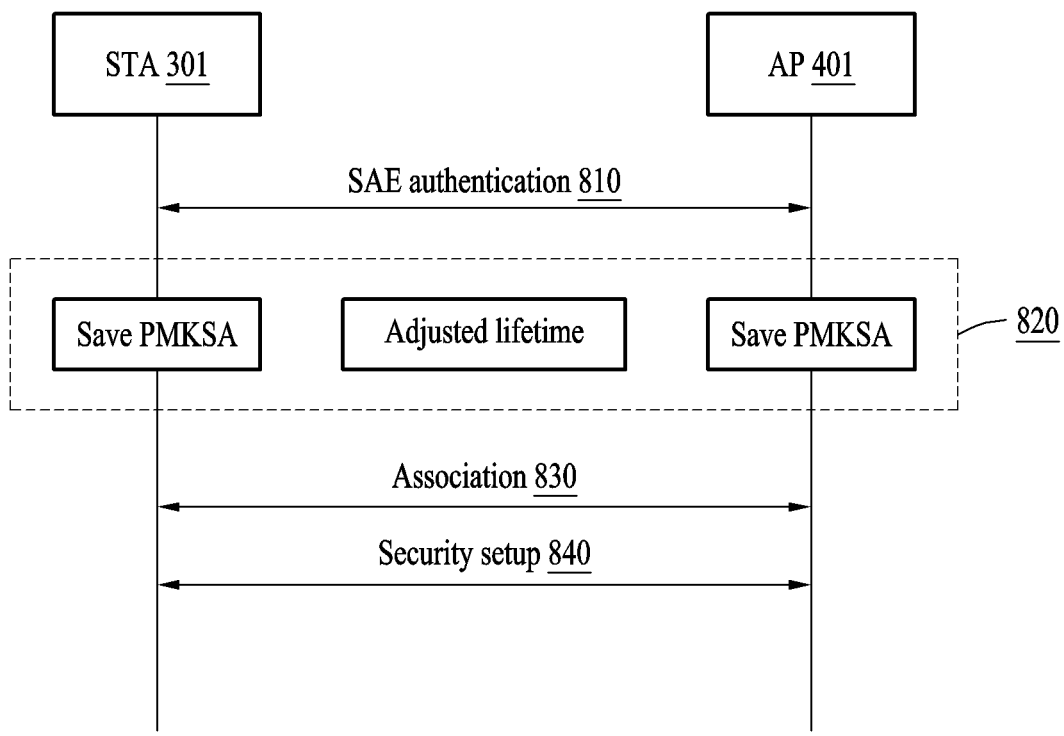
FIG. 8 is a flow diagram illustrating another example of a method of using a PMK, according to various example embodiments.

FIG. 8 illustrates a flow diagram of another example of a method of using a PMK, according to various example embodiments.

Referring to FIG. 8, according to various example embodiments, when the STA 301 connects (e.g., the first connection) to the AP 401, the STA 301 may generate a PMK according to an SAE protocol and may adjust and use a default value of a lifetime of the PMK such that the PMK does not expire during the connection to the AP 401. The STA 301 may perform communication by setting the lifetime of the PMK to an adjusted value such that the PMK does not expire during one connection to the AP 401.

In operation 810, the STA 301 may generate a PMK according to the SAE protocol when the STA is connected to the AP 401. The AP 401 may also generate a PMK according to the SAE protocol.

In operation 820, the STA 301 may store the PMK in a PMKSA for the AP 401. The AP 401 may also store the PMK in a PMKSA for the STA 301. The STA 301 may not set the lifetime of the PMK to a default value, and may adjust the default value based on usage information, of a user (e.g., a user of the STA 301), on wireless communication (e.g., Wi-Fi) supported by the AP 401. The STA 301 may set the lifetime of the PMK to the adjusted value. The usage information of the user may include at least one of a Wi-Fi connection time and a Wi-Fi usage pattern of the user. For example, the Wi-Fi connection time of the user may include a connection time of the STA 301 to the AP 401 and the Wi-Fi usage pattern may include a usage time pattern of the STA 301 for the AP 401.

In operations 830 and 840, the STA 301 and the AP 401 may communicate with each other after performing an association operation and a security setup operation.

According to various example embodiments (not shown), the STA 301 may dynamically set (e.g., change) the default value of the lifetime of the PMK, based on the usage information (e.g. the latest usage information) for each time the PMK (e.g., a new PMK) is generated according to the SAE protocol when the STA 301 is connected to the AP 401.

Figure 9A:
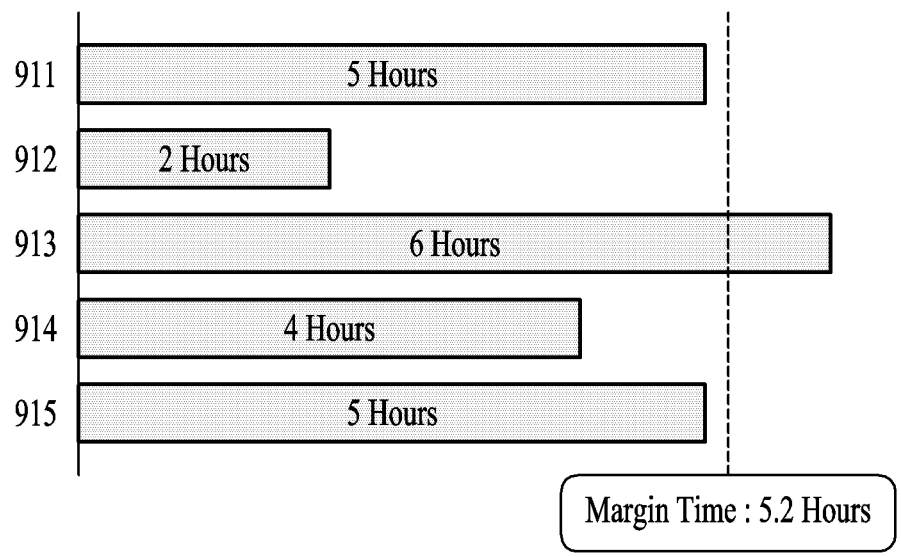
FIGS. 9A, 9B and 9C are data charts illustrating exemplary execution cases of setting a margin time, according to various example embodiments.

FIG. 9A illustrates an example of setting a margin time according to various example embodiments.

Referring to FIG. 9A, a connection time of a user (e.g., a user of the STA 301) to the AP 401 may be used as usage information of the user for setting a margin time. Data on the connection time of the user to the AP 401 may be obtained and the obtained data may be used for setting the margin time. For example, when the data on the connection time of the user to the AP 401 is obtained in five cases 911 to 915 as shown in FIG. 9A, the margin time may be determined to be 5.2 hours to cover predetermined cases (e.g., greater than or equal to 80%) among the five cases 911 to 915. As the margin time is set as described above, the cases 911, 912, 914, and 915 may use Wi-Fi without disconnection since each of these connection times will conclude, and the STA 301 may then communicate with the AP 401 by generating a new PMK, when the remaining lifetime of the PMK is at least one hour. According to various example embodiments, the STA 301 may dynamically determine the margin time based on the data on the connection time of the user (e.g., the user of the STA 301) to the AP 401.

Figure 9B:
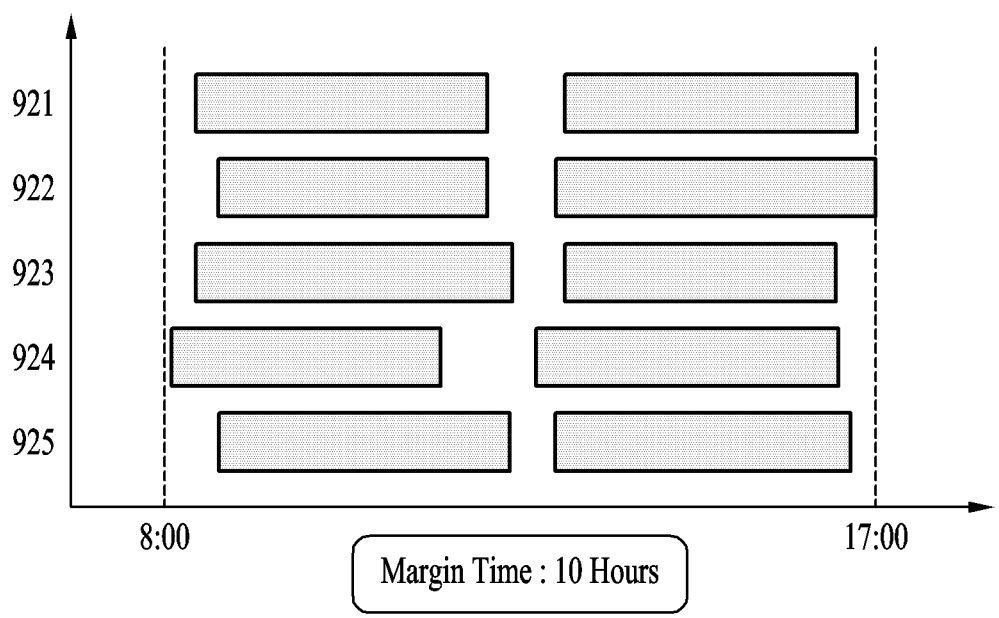

FIG. 9B illustrates another example of setting a margin time according to various example embodiments.

Referring to FIG. 9B, for setting the margin time, a usage time pattern of a user (e.g. the user of the STA 301) to the AP 401 may be used as the usage information of the user. Usage time data of the user to the AP 401 may be obtained by months, dates, and/or days, and the obtained data may be used to identify the usage pattern of the user and set the margin time. In addition, the usage time data may be used to determine a time point to determine the lifetime of the PMK by using the margin time. For example, when the usage time data of the user to the AP 401 is obtained in five cases 921 to 925, it may be identified that the user typically connects to the AP 401 between 8:00 and 9:00, disconnects in the middle, and the last disconnection time is 17:00. Accordingly, the margin time may be determined to be 10 hours, and the STA 301 may determine the margin time only for the first connection to the AP 401.

Figure 9C:
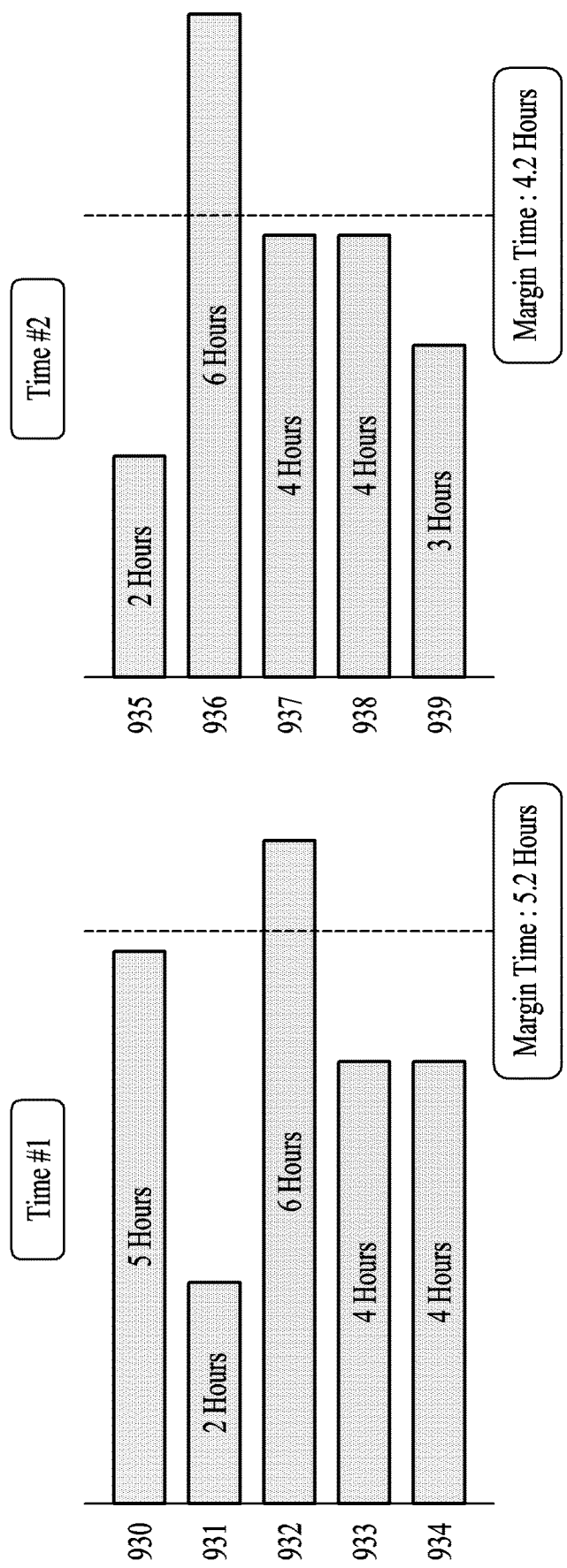

FIG. 9C illustrates another example of setting a margin time according to various example embodiments.

Referring to FIG. 9C, the STA 301 may dynamically manage the margin time based on the usage information (e.g., the latest usage information) of the user. In a first setting Time #1, the STA 301 may contain five pieces of data 930 to 934 on connection times for the AP 401, may determine a time of five hours to cover 80% of the connection times from the pieces of data 930 to 934 contained by the STA 301, and may determine the margin time by adding 0.2 hours to the time, that is, 5.2 hours. In a second setting Time #2 after the first setting Time #1, the STA 301 may obtain five new pieces of data 935 to 939 on connection times for the AP 401, may determine a time of four hours to cover 80% of the connection times from the obtained pieces of data 935 to 939, and may change and set the margin time to 4.2 hours by adding 0.2 hours. In an example embodiment, the STA 301 may periodically update the usage information (e.g., the connection time and/or the usage time pattern) of the user.

Figure 10:
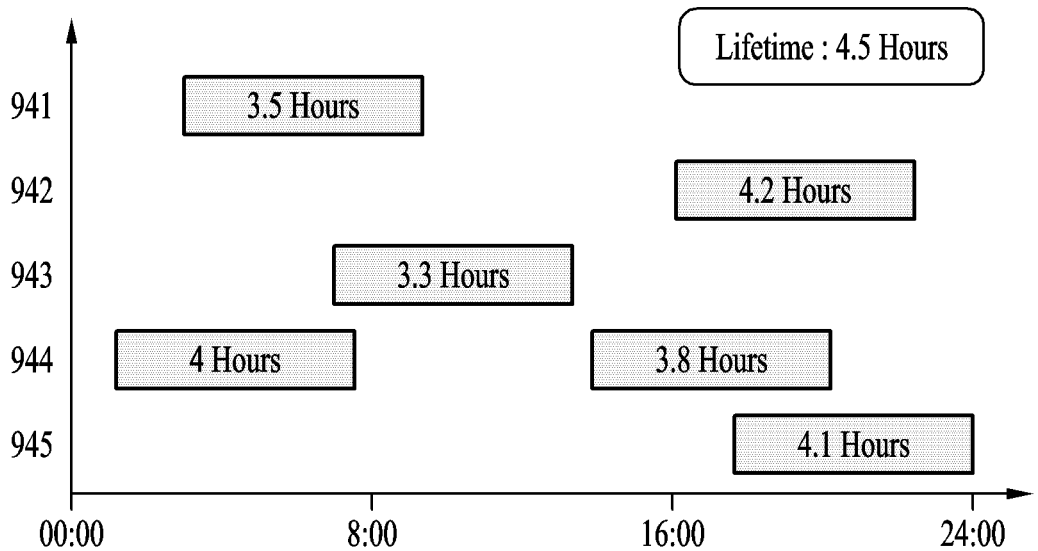
FIG. 10 illustrates an example of adjusting a default value of a lifetime of a PMK, according to various example embodiments.

FIG. 10 illustrates an example of adjusting a default value of a lifetime of a PMK, according to various example embodiments.

Referring to FIG. 10, a connection time of a user (e.g., a user of the STA 301) to the AP 401 may be used as usage information of the user for adjusting a default value of a lifetime of a PMK. Data on the connection time of the user to the AP 401 may be obtained by months, dates, and/or days, and the STA 301 may adjust the default value (e.g., 12 hours) of the lifetime of the PMK by using the obtained data such that the PMK does not expire during one connection to the AP 401. For example, when pieces of data 941 to 945 on connection times of the user to the AP 401 are obtained as shown in FIG. 10, the lifetime of the PMK for the AP 401 may be determined to be an adjusted value (e.g., 4.5 hours).

The method of setting the margin time, described with reference to FIGS. 9A to 9C, may be substantially identically applicable to the method of adjusting the default value of the lifetime of the PMK.

Figure 11:
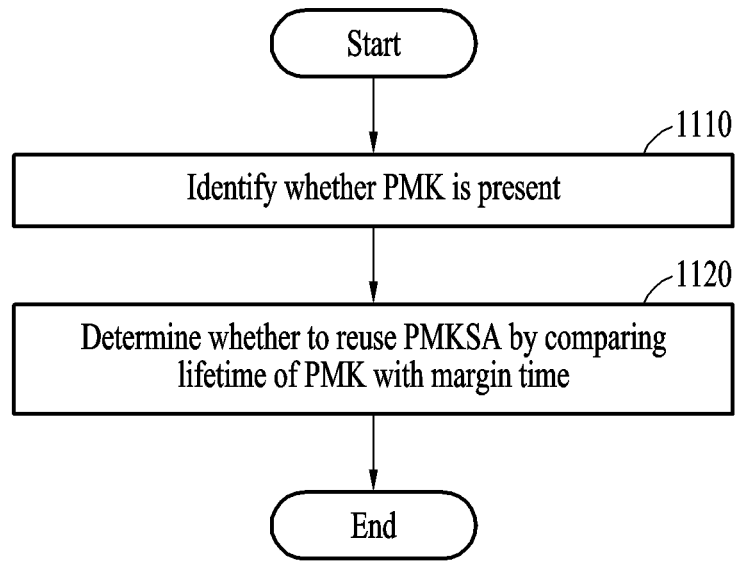
FIG. 11 is a flow diagram illustrating an example of an operating method of a station (STA), according to various example embodiments.

FIG. 11 illustrates a flow diagram of an example of an operating method of a station (STA), according to various example embodiments.

In operation 1110, when the STA 301 attempts to connect with the AP 401, the STA 301 may identify whether a PMKSA, which is generated when the STA 301 is connected to the AP 401, for the AP 401 is present.

In operation 1120, if the PMKSA is present, the STA 301 may determine whether to reuse a PMK by comparing the lifetime of the PMK stored in the PMKSA with a margin time in which the use of the PMK is guaranteed. For example, the STA 301 may perform a connection to the AP 401 by reusing the PMK in case the lifetime of the PMK is greater than the margin time. If the STA 301 determines not to reuse the PMK or the PMK is not present, the STA 301 may perform an operation of obtaining a new PMK. The operation of obtaining the new PMK may be an SAE authentication operation.

Figure 12:
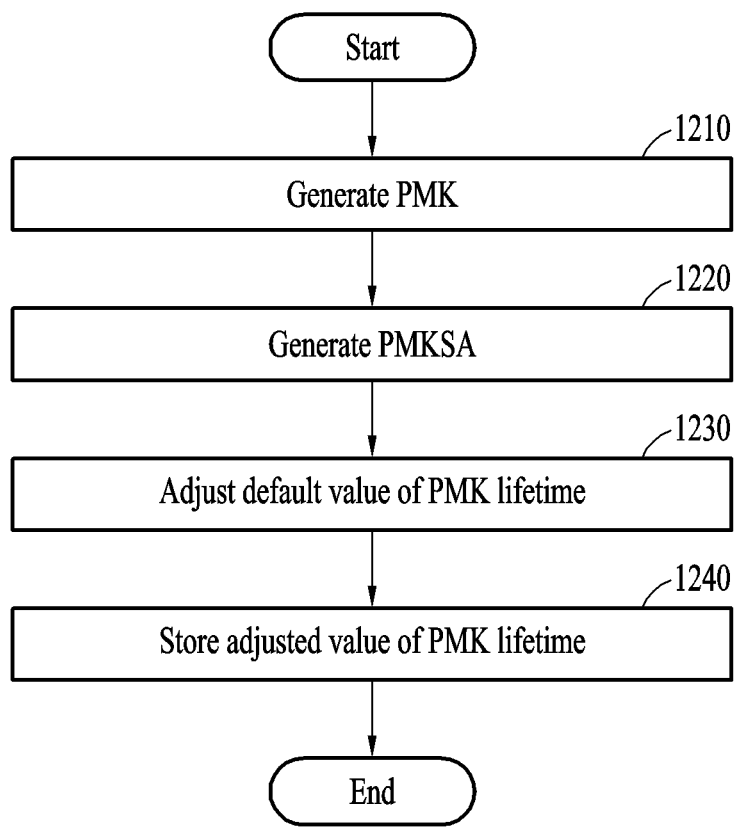
FIG. 12 is a flow diagram illustrating another example of an operating method of an STA, according to various example embodiments.

FIG. 12 illustrates a flow diagram of another example of an operating method of an STA, according to various example embodiments.

In operation 1210, the STA 301 may generate a PMK when the STA 301 is connected to the AP 401.

In operation 1220, the STA 301 may generate a PMKSA for the AP 401.

In operation 1230, the STA 301 may adjust a default value of a lifetime of the PMK, based on a user's usage information on wireless communication supported by the AP 401, and in operation 1240, the STA 301 may store an adjusted value of the lifetime of the PMK in the PMKSA.

FIG. 13 is a block diagram illustrating an electronic device 1301 in a network environment 1300 according to various example embodiments. Referring to FIG. 13, the electronic device 1301 (e.g., the STA 301 of FIG. 4) in the network environment 1300 may communicate with an electronic device 1302 (e.g., the STA 301 of FIG. 4) via a first network 1398 (e.g., a short-range wireless communication network), or communicate with at least one of an electronic device 1304 (e.g., the STA 301 of FIG. 4) or a server 1308 via a second network 1399 (e.g., a long-range wireless communication network). According to an example embodiment, the electronic device 1301 may communicate with the electronic device 1304 via the server 1308. According to an example embodiment, the electronic device 1301 may include a processor 1320, a memory 1330, an input module 1350, a sound output module 1355, a display module 1360, an audio module 1370, and a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some example embodiments, at least one of the components (e.g., the connecting terminal 1378) may be omitted from the electronic device 1301, or one or more other components may be added in the electronic device 1301. In some example embodiments, some of the components (e.g., the sensor module 1376, the camera module 1380, or the antenna module 1397) may be integrated as a single component (e.g., the display module 1360).

The processor 1320 may execute, for example, software (e.g., a program 1340) to control at least one other component (e.g., a hardware or software component) of the electronic device 1301 connected to the processor 1320, and may perform various data processing or computation. According to an example embodiment, as at least a part of data processing or computation, the processor 1320 may store a command or data received from another component (e.g., the sensor module 1376 or the communication module 1390) in a volatile memory 1332, process the command or the data stored in the volatile memory 1332, and store resulting data in a non-volatile memory 1334. According to an example embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with the main processor 1321. For example, when the electronic device 1301 includes the main processor 1321 and the auxiliary processor 1323, the auxiliary processor 1323 may be adapted to consume less power than the main processor 1321 or to be specific to a specified function. The auxiliary processor 1323 may be implemented separately from the main processor 1321 or as a part of the main processor 1321.

The auxiliary processor 1323 may control at least some of functions or states related to at least one (e.g., the display module 1360, the sensor module 1376, or the communication module 1390) of the components of the electronic device 1301, instead of the main processor 1321 while the main processor 1321 is in an inactive (e.g., sleep) state or along with the main processor 1321 while the main processor 1321 is an active state (e.g., executing an application). According to an example embodiment, the auxiliary processor 1323 (e.g., an ISP or a CP) may be implemented as a portion of another component (e.g., the camera module 1380 or the communication module 1390) that is functionally related to the auxiliary processor 1323. According to an example embodiment, the auxiliary processor 1323 (e.g., an NPU) may include a hardware structure specified for artificial intelligence model processing. An artificial intelligence model may be generated by machine learning. Such learning may be performed by, for example, the electronic device 1301 in which an artificial intelligence model is executed, or performed via a separate server (e.g., the server 1308). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334. The non-volatile memory 1334 may include an internal memory 1336 and an external memory 1338.

The program 1340 may be stored as software in the memory 1330, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output a sound signal to the outside of the electronic device 1301. The sound output module 1355 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 1360 may visually provide information to the outside (e.g., a user) of the electronic device 1301. The display module 1360 may include, for example, a control circuit for controlling a display, a hologram device, or a projector and control circuitry to control a corresponding one of the display, the hologram device, and the projector. According to an example embodiment, the display module 1360 may include a touch sensor adapted to detect a touch, or a pressure sensor adapted to measure the intensity of force incurred by the touch.

The audio module 1370 may convert a sound into an electrical signal or vice versa. According to an example embodiment, the audio module 1370 may obtain the sound via the input module 1350 or output the sound via the sound output module 1355 or an external electronic device (e.g., the electronic device 1302 such as a speaker or a headphone) directly or wirelessly connected to the electronic device 1301.

The sensor module 1376 may detect an operational state (e.g., power or temperature) of the electronic device 1301 or an environmental state (e.g., a state of a user) external to the electronic device 1301, and generate an electric signal or data value corresponding to the detected state. According to an example embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an example embodiment, the interface 1377 may include, for example, a high-definition multimedia interface (HDMI), a universal serial bus (USB) interface, a secure digital (SD) card interface, or an audio interface.

The connecting terminal 1378 may include a connector via which the electronic device 1301 may be physically connected to an external electronic device (e.g., the electronic device 1302). According to an example embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via his or her tactile sensation or kinesthetic sensation. According to an example embodiment, the haptic module 1379 may include, for example, a motor, a piezoelectric element, or an electric stimulator.

The camera module 1380 may capture a still image and moving images. According to an example embodiment, the camera module 1380 may include one or more lenses, image sensors, image signal processors, or flashes.

The power management module 1388 may manage power supplied to the electronic device 1301. According to an example embodiment, the power management module 1388 may be implemented as, for example, at least a part of a power management integrated circuit (PMIC).

The battery 1389 may supply power to at least one component of the electronic device 1301. According to an example embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently of the processor 1320 (e.g., an AP) and that support a direct (e.g., wired) communication or a wireless communication. According to an example embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module, or a power line communication (PLC) module). A corresponding one of these communication modules may communicate with the external electronic device 1304 via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the SIM 1396.

The wireless communication module 1392 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., a mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 1392 may support various requirements specified in the electronic device 1301, an external electronic device (e.g., the electronic device 1304), or a network system (e.g., the second network 1399). According to an example embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an example embodiment, the antenna module 1397 may include an antenna including a radiating element including a conductive material or a conductive pattern formed in or on a substrate (e.g., a printed circuit board (PCB)). According to an example embodiment, the antenna module 1397 may include a plurality of antennas (e.g., array antennas). In such a case, at least one antenna appropriate for a communication scheme used in a communication network, such as the first network 1398 or the second network 1399, may be selected by, for example, the communication module 1390 from the plurality of antennas. The signal or the power may be transmitted or received between the communication module 1390 and the external electronic device via the at least one selected antenna. According to an example embodiment, another component (e.g., a radio frequency integrated circuit (RFIC)) other than the radiating element may be additionally formed as a part of the antenna module 1397.

According to various example embodiments, the antenna module 1397 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 1301 and the external electronic device 1304 via the server 1308 coupled with the second network 1399. Each of the external electronic devices 1302 or 1304 may be a device of the same type as or a different type from the electronic device 1301. According to an example embodiment, all or some of operations to be executed by the electronic device 1301 may be executed at one or more of the external electronic devices 1302 and 1304, and the server 1308. For example, if the electronic device 1301 needs to perform a function or a service automatically, or in response to a request from a user or another device, the electronic device

1301, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another example embodiment, the external electronic device 1304 may include an Internet-of-things (IoT) device. The server 1308 may be an intelligent server using machine learning and/or a neural network. According to an example embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 1340) including one or more instructions that are stored in a storage medium (e.g., the internal memory 1336 or the external memory 1338) that is readable by a machine (e.g., the electronic device 1301) For example, a processor (e.g., the processor 1320) of the machine (e.g., the electronic device 1301) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

According to various example embodiments, an electronic device (e.g., the STA 301 of FIG. 4 or the electronic device 1301 of FIG. 13) may include at least one wireless communication module (e.g., the wireless communication module 1392 of FIG. 13) configured to transmit and receive a wireless signal, at least one processor (e.g., the processor 1320 of FIG. 13) operatively connected to the wireless communication module, a memory (e.g., the memory 1330 of FIG. 13) electrically connected to the processor and configured to store instructions executable by the processor, wherein, in response to the instructions being executed by the processor, the processor is configured to, via the wireless communication module, in response to an attempt at connecting to an AP (e.g., the AP 401 of FIG. 4), identify whether a PMKSA for the AP is present (e.g., operation 1110 of FIG. 11), wherein the PMKSA for the AP is generated in response to connection to the AP, and if the PMKSA is present, determine whether to reuse a PMK (e.g., operation 1120 of FIG. 11) stored in the PMKSA by comparing a lifetime of the PMK with a margin time in which a use of the PMK is guaranteed.

According to various example embodiments, the margin time may be set based on a user's usage information on wireless communication supported by the AP.

According to various example embodiments, the usage information may include at least one of a connection time or a usage time pattern with respect to the AP.

According to various example embodiments, the processor may be configured to, if the lifetime of the PMK is greater than the margin time, perform a connection to the AP by reusing the PMK (e.g., operation 740 of FIG. 7), and if the lifetime of the PMK is not greater than the margin time or the PMK is not present, performing an operation of obtaining a new PMK (e.g., operation 750 of FIG. 7).

According to various example embodiments, the operation of obtaining the new PMK may be an SAE authentication operation (e.g., operations 430 to 460 of FIG. 4).

According to various example embodiments, the processor may be further configured to dynamically change the margin time based on a user's usage information on the wireless communication supported by the AP.

According to various example embodiments, the margin time may be determined and used for each device, user, SSID, and BSSID.

According to various example embodiments, the processor may be further configured to periodically update the usage information of the user.

According to various example embodiments, an electronic device (e.g., the STA 301 of FIG. 4 or the electronic device 1301 of FIG. 13) may include at least one wireless communication module (e.g., the wireless communication module 1392 of FIG. 13) configured to transmit and receive a wireless signal, at least one processor (e.g., the processor 1320 of FIG. 13) operatively connected to the wireless communication module, a memory (e.g., the memory 1330 of FIG. 13) electrically connected to the processor and configured to store instructions executable by the processor, wherein, in response to the instructions being executed by the processor, the processor may be configured to, via the wireless communication module, generate a PMK (e.g., operation 1210 of FIG. 12) in response to connection to an AP, generate a PMKSA for the AP (e.g., operation 1220 of FIG. 12), adjust a default value of a lifetime of the PMK (e.g., operation 1230 of FIG. 12), based on a user's usage information on wireless communication supported by the AP, and store an adjusted value of the lifetime of the PMK in the PMKSA (e.g., operation 1240 of FIG. 12).

According to various example embodiments, the processor may be further configured to generate the PMK by performing an SAE authentication operation (e.g., operations 430 to 460 of FIG. 4).

According to various example embodiments, the usage information may include at least one of a connection time and a usage time pattern with respect to the AP.

According to various example embodiments, the processor may dynamically change the default value of a lifetime of the new PMK for each time a new PMK is generated in response to connection to the AP, based on the usage information of the user.

According to various example embodiments, the processor may be further configured to periodically update the usage information of the user.

According to various example embodiments, an operating method of an electronic device (e.g., the STA 301 of FIG. 4 or the electronic device 1301 of FIG. 13) may include, when the electronic device attempts to connect to an AP (e.g., the AP 401 of FIG. 4), identifying whether a PMKSA for the AP is present (e.g., operation 1110 of FIG. 11), wherein the PMKSA for the AP is generated when the electronic device is connected to the AP, and if the PMKSA is present, determining whether to reuse a PMK by comparing a lifetime of the PMK stored in the PMKSA with a margin time in which the use of the PMK is guaranteed (e.g., operation 1120 of FIG. 11).

According to various example embodiments, the margin time may be set based on a user's usage information on wireless communication supported by the AP.

According to various example embodiments, the usage information may include at least one of a connection time or a usage time pattern with respect to the AP.

According to various example embodiments, the operating method may further include, if the lifetime of the PMK is greater than the margin time, performing connection to the AP by reusing the PMK (e.g., operation 740 of FIG. 7), or if the lifetime of the PMK is not greater than the margin time or the PMK is not present, performing an operation of obtaining a new PMK (e.g., operation 750 of FIG. 7).

According to various example embodiments, the operation of obtaining the new PMK may be an SAE authentication operation (e.g., operations 430 to 460 of FIG. 4).

According to various example embodiments, the operating method may further include dynamically changing the margin time based on the user's usage information on the wireless communication supported by the AP.

According to various example embodiments, the margin time may be determined and used for each device, user, SSID, and BSSID.

What is claimed is:

1. An electronic device comprising:
   at least one wireless communication module configured to transmit and receive a wireless signal;
   a memory configured to store instructions; and
   at least one processor operatively connected to the at least one wireless communication module and the memory, the at least one processor being configured to execute the instructions to:
   based on an attempt to connect to an access point (AP), identify whether a pairwise master key security association (PMKSA) for the AP, generated based on to a previous connection of the electronic device to the AP, is present, and
   based on identifying that the PMKSA is present, determine whether to reuse a pairwise master key (PMK) stored in the PMKSA by comparing a lifetime of the PMK with a margin time in which a reuse of the PMK is guaranteed,
   wherein the margin time indicates a time period during which the PMK stored in the PMKSA does not expire.

2. The electronic device of claim 1, wherein the margin time is set based on usage information on wireless communication supported by the AP.

3. The electronic device of claim 2, wherein the usage information comprises at least one of a connection time and a usage time pattern with respect to the AP.

4. The electronic device of claim 3, wherein the operation of obtaining the new PMK comprises a simultaneous authentication of equals (SAE) authentication operation.

5. The electronic device of claim 1, wherein the at least one processor is further configured to execute the instructions to:
based on the lifetime of the PMK being greater than the margin time, perform a connection to the AP by reusing the PMK, and
based on the lifetime of the PMK not being greater than the margin time or the PMK not being present, perform an operation of obtaining a new PMK.

6. The electronic device of claim 1, wherein the at least one processor is further configured to dynamically change the margin time based on usage information on wireless communication supported by the AP.

7. The electronic device of claim 6, wherein the a least one processor is further configured to execute the instructions to periodically update the usage information.

8. The electronic device of claim 1, wherein the margin time is determined and used for each device, user, service set identifier (SSID), and basic service set identifier (BSSID).

9. An electronic device comprising:
at least one wireless communication module configured to transmit and receive a wireless signal;
a memory configured to store instructions; and
at least one processor operatively connected to the at least one wireless communication module and the memory, the at least one processor being configured to execute the instructions to:
generate a pairwise master key (PMK) based on a connection to an access point (AP),
generate a PMK security association (PMKSA) for the AP,
adjust a default value of a lifetime of the PMK, based on usage information on wireless communication supported by the AP, and
store an adjusted value of the lifetime of the PMK in the PMKSA,
wherein the adjusted value indicates a time period during which the PMK stored in the PMKSA does not expire.

10. The electronic device of claim 9, wherein the at least one processor is further configured to execute the instructions to generate the PMK by performing a simultaneous authentication of equals (SAE) authentication operation.

11. The electronic device of claim 9, wherein the usage information comprises at least one of a connection time and a usage time pattern with respect to the AP.

12. The electronic device of claim 9, wherein the at least one processor is further configured to execute the instructions to, for each time a new PMK is generated based on a connection to the AP, dynamically change a default value of a lifetime of the new PMK, based on the usage information.

13. The electronic device of claim 9, wherein the at least one processor is further configured to periodically update the usage information.

14. An operating method of an electronic device, the operating method comprising:
based on the electronic device attempting to connect to an access point (AP), identifying whether a pairwise master key security association (PMKSA) for the AP, generated based on a previous connection of the electronic device to the AP, is present; and
based on identifying that the PMKSA is present, determining whether to reuse a pairwise master key (PMK) stored in the PMKSA by comparing a lifetime of the PMK with a margin time in which a reuse of the PMK is guaranteed,
wherein the margin time indicates a time period during which the PMK stored in the PMKSA does not expire.

15. The operating method of claim 14, wherein the margin time is set based on usage information on wireless communication supported by the AP.

16. The operating method of claim 15, further comprising:
based on the lifetime of the PMK being greater than the margin time, performing a connection to the AP by reusing the PMK; and
based on the lifetime of the PMK not being greater than the margin time or the PMK not being present, performing an operation of obtaining a new PMK.

17. The operating method of claim 16, wherein the operation of obtaining the new PMK comprises a simultaneous authentication of equals (SAE) authentication operation.

18. The operating method of claim 14, wherein the usage information comprises at least one of a connection time or a usage time pattern with respect to the AP.

19. The operating method of claim 14, further comprising:
dynamically changing the margin time based on usage information on wireless communication supported by the AP.

20. The operating method of claim 14, wherein the margin time is determined and used for each device, user, service set identifier (SSID), and basic service set identifier (BSSID).

* * * * *